United States Patent [19]

Nagane

[11] Patent Number: 5,335,083
[45] Date of Patent: Aug. 2, 1994

[54] CIRCUIT SUBSTRATE HOLDING APPARATUS FOR A FACSIMILE

[75] Inventor: Hiromichi Nagane, Yokohama, Japan

[73] Assignee: Canon Kabushiki Kaisha, Tokyo, Japan

[21] Appl. No.: 94,922

[22] Filed: Jul. 22, 1993

Related U.S. Application Data

[63] Continuation of Ser. No. 710,836, Jun. 5, 1991.

[30] Foreign Application Priority Data

| Jun. 7, 1990 | [JP] | Japan | 2-150211 |
| Jul. 11, 1990 | [JP] | Japan | 2-184649 |
| Jul. 11, 1990 | [JP] | Japan | 2-184651 |
| Jul. 11, 1990 | [JP] | Japan | 2-184652 |
| Jul. 11, 1990 | [JP] | Japan | 2-184653 |

[51] Int. Cl.$^5$ ............................................. H05K 7/16
[52] U.S. Cl. ................................. 358/400; 361/725
[58] Field of Search ............ 358/452, 461, 75, 498, 358/400, 254; 361/391, 390, 412–415, 380; 350/500

[56] References Cited

U.S. PATENT DOCUMENTS

| 4,698,650 | 10/1987 | Watanabe et al. | 346/134 |
| 4,704,638 | 11/1987 | Igarashi | 358/497 |
| 4,833,547 | 5/1989 | Mase | 358/400 |
| 4,835,619 | 5/1989 | Kobori et al. | 358/294 |

FOREIGN PATENT DOCUMENTS

| 0073696 | 3/1990 | Japan | 361/415 |

*Primary Examiner*—Mark R. Powell
*Assistant Examiner*—Jill Jackson
*Attorney, Agent, or Firm*—Fitzpatrick, Cella, Harper & Scinto

[57] ABSTRACT

In the apparatus described in the present invention, a control circuit substrate is arranged on the bottom portion of the apparatus body, a bottom cover capable of opening and closing the bottom portion of the apparatus serves as a support member, input/output terminals for lines to be connected to the control circuit substrate are positioned at the side of the apparatus body, and retaining frames for the input/output terminals are integrally formed with the bottom cover so as to constitute a part of the side wall of the apparatus body.

6 Claims, 9 Drawing Sheets

CIRCUIT SUBSTRATE HOLDING APPARATUS FOR A FACSIMILE

This application is a continuation of application Ser. No. 07/710,836, filed Jan. 5, 1991.

BACKGROUND OF THE INVENTION

1. Field of the Invention

The present invention relates to a facsimile apparatus adapted to cope with different specifications in various countries.

2. Related Background

With the rapid spread of facsimiles all over the world in recent years, it is required to easily cope with different power supplies such as 100V, 120V, and 230V and different public lines in various countries. Moreover, it is also desired that parts be easily molded and fabricated in any place as they are locally manufactured all over the world. Further, a facsimile structure on which it is easy to perform the maintenance work is also needed.

The conventional facsimile apparatus has a construction in which a plurality of molded top covers 32 and bottom covers 33 are mounted on a molded body frame 31 as shown in FIG. 9. In order to assemble such facsimile, a control circuit substrate 34 (including a system control unit and a network control unit) is first attached onto the bottom cover 33, and then there is arranged the body frame 31 on which units and electronic components are assembled so as to drop-in. In the course of this assembling, an input/output terminal 35 for circuits or the like is fixed to the far side (left side in the figure) of the bottom cover 33. Finally, the upper cover 32 and the like are mounted to complete the assembling.

There is a case where two different circuit substrate units, that is, a first and a second circuit substrate units are separated by the body frame. Under such condition, the first circuit substrate unit is electrically connected with the second circuit substrate through an aperture provided in the body frame.

For example, to electrically connect a power supply unit 41 with the control circuit substrate 34 during assembly, a first connector 42a located at one end of a connection cord 42 is previously coupled with a power supply connector 41a of a power supply substrate 41₁, a second connector 42b located at another end of the connection cord 42 is passed through an aperture 43 from the left side, and then the power supply unit 41 is fitted into a receiving portion provided at the end of the apparatus body. And finally the second connector 42b of the connection cord 42 is linked with a control connector 34a of the control circuit substrate 34.

The operations for previously coupling the first connector 42a of the connection cord 42 with the power supply connector 41a and for inserting the second connector 42b of the connection cord 42 into the aperture are difficult to carry out by an automatic machine, and hence it is to be manually performed.

Accordingly, in the case where each unit is automatically assembled by a drop-in method, during the assembly of the power supply unit 41, the automatic assembling work has to be interrupted temporarily to perform a manual working. After that, the automatic assembling work is restarted, which leads to the increase in the number of working processes, resulting in an extremely insufficient and time-consuming assembling steps, and consequently brings about a raise in production costs.

This problem may arise not only in the case of the electrical connection between the power supply unit 41 and the control circuit substrate 34, but also in the case of an electrical connection between two circuit substrate units which are separated by the body frame, such as the connection between the control circuit substrate and other circuit substrate.

Further, on the body frame 31, there is provided a roll paper receiving section 40 which has hook apertures 40a, 40b for catches of a partition which differs according to the sheet width such as A4 and B4. It is therefore feared that through these apertures 40a, 40b foreign matters such as clicks and pins may fall to cause a short circuit. As an expedient, a net can be put up over the control circuit substrate 34 to prevent the foreign matters from falling onto the control circuit substrate 34.

Moreover, as to the facsimile apparatus, there are needs to correct due to assembling defects and to check the control circuit substrate 34 to perform maintenance in the market. In this case, the conventional facsimile apparatus requires extremely time-consuming work in which after the removal of the upper cover 32, the body frame 31 loaded with the units or electronic components has to be raised so as to turn in the direction of R around a shaft 36 to execute the checking operation of the control circuit substrate 34. In addition, in case of a change in specifications, the once assembled apparatus has to be disassembled and then reassembled.

In order to solve such inconveniences, the bottom portion of some facsimile apparatus serves as a bottom cover 37 capable of opening and closing as shown in FIG. 10.

In such an apparatus, the body and the side wall are integrally molded as the body frame 38, and then sheathed with the bottom cover 37 and upper cover 39. To this bottom cover, there is provided the control circuit substrate 34 of which dimensions are extremely restricted, which results from the fact the lower end of the body frame 38 is of a very thin section due to the draft angle, leading to the difficulties of molding. In other words, providing the height h above the substrate 34 is required to be 30 to 40 mm, an end $x_2$ of the body frame 38 becomes extremely thin to be liable to cause a defective molding. The reason is that in view of the mold structure the draft angles of at least 3 degrees for the external surface S and at least 1 degree for the inner wall T must be provided due to the graining or other processing. On the contrary, unless the section of the body frame 38 is uniform, there arise sunk spots and welds, and hence it is impossible for the thickness $x_1$ to be larger than 3 to 4 mm, which leads to a smaller $x_2$. Accordingly, the apparatus body having such structure has not been manufactured in practice, but instead a construction as shown in FIG. 11 is employed. This facsimile apparatus has at its bottom portion a baggy portion 38a to overcome the above disadvantages. Because of not only doubling the thickness of the end but also need of the thickness $x_3$ for a core die, the substrate space $x_4$ is smaller for the size of the apparatus.

In consequence, when a speaker or other large-sized electric components are arranged on such facsimile apparatus, the apparatus body becomes even larger.

SUMMARY OF THE INVENTION

It is a primary object of the present invention to solve the above disadvantages and to provide a facsimile apparatus which is easy to change the destinations and to perform the maintenance.

A second object of the present invention is to provide a facsimile apparatus which is firm and easy to assemble.

A third object of the present invention is to provide a facsimile apparatus in which foreign matters are prevented from falling onto the control circuit substrate through apertures provided on the recording roll paper receiving portion.

It is a fourth object of the present invention to solve the above disadvantages and to provide a facsimile apparatus in which large-sized electric components are arranged in a dead space of the apparatus.

A fifth object of the present invention is to provide a facsimile apparatus in which circuit substrate units are connected with each other without difficulty to ensure the effective assembling.

DESCRIPTION OF THE PREFERRED EMBODIMENTS

An embodiment of the present invention will be described hereinafter with reference to the accompanying drawings.

Figure 1:
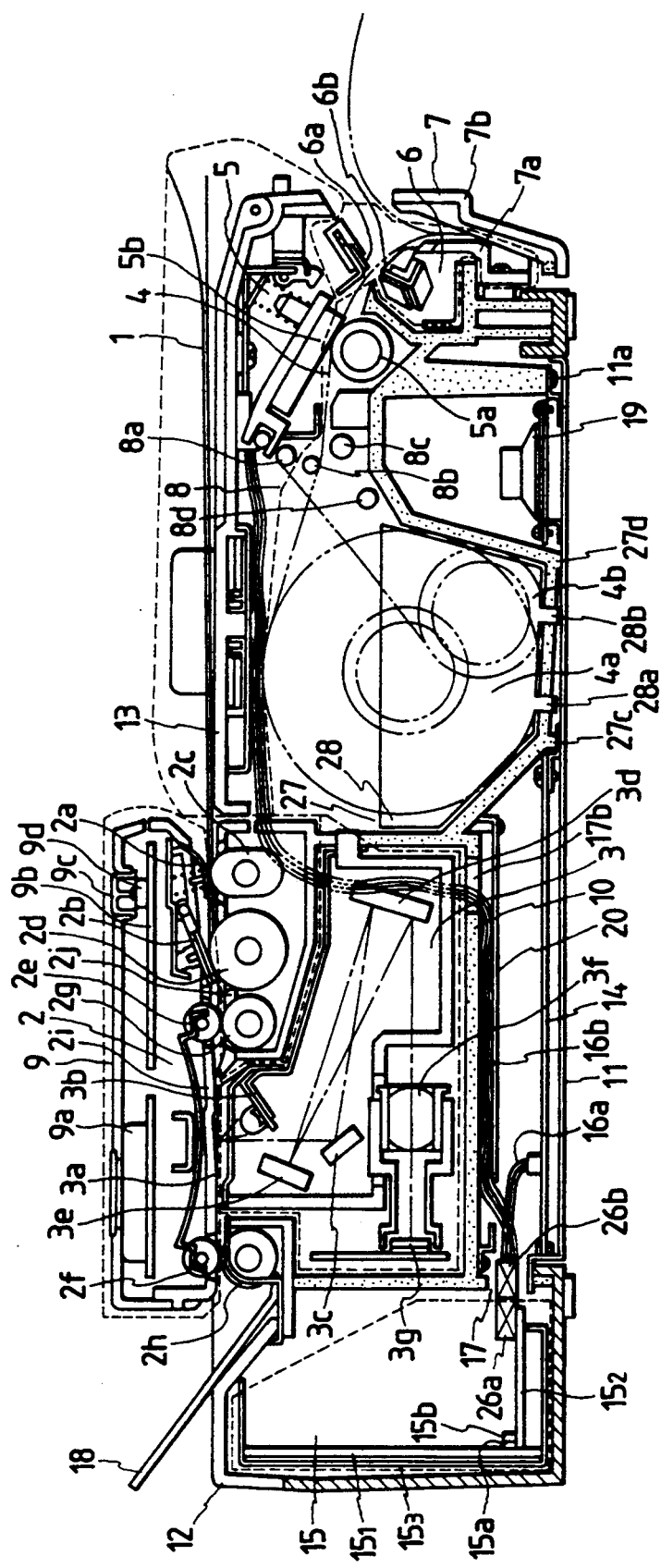
FIG. 1 is a structural drawing of the facsimile apparatus in accordance with an embodiment of the present invention.
Figure 2:
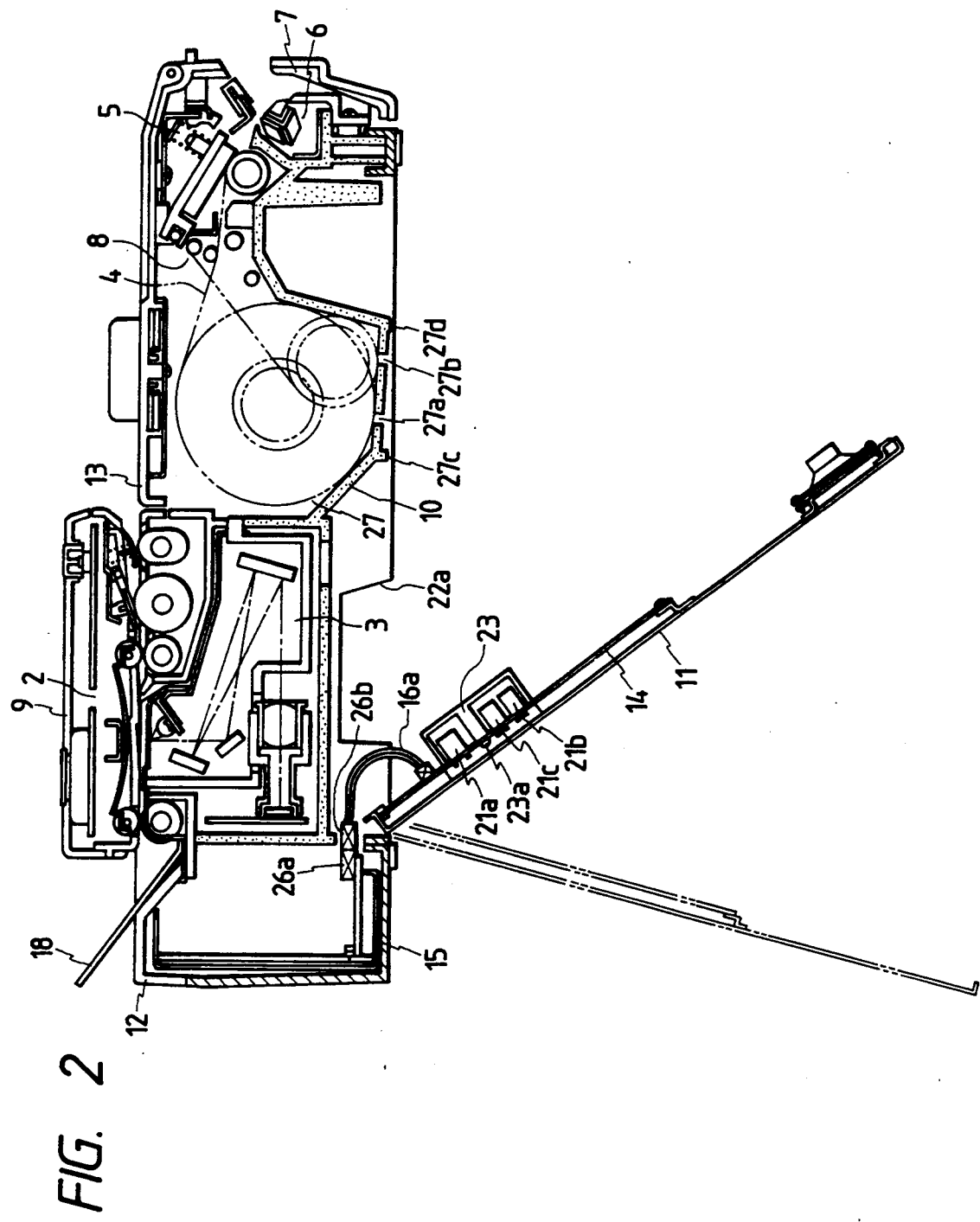
FIG. 2 shows the facsimile apparatus in FIG. 1 with a bottom cover opened.

FIG. 1 shows the overall structure of the apparatus, where reference numeral 1 denotes an original, 2 a document conveying section which forms at its lower portion an assembling unit as shown by a broken line. Reference numeral 3 represents an optical reading section which forms a unit at the time of assembling as shown by a broken line, reference numeral 4 denotes a thermosensible recording paper, 5 a printing section, and 6 a record paper cutting portion which forms a unit when assembled as shown by a broken line. Reference numeral 7 denotes an ejected paper stack, 8 a record paper curling elimination section, and 9 an operation panel which forms a unit as shown by a broken line in cooperation with the upper portion of the document conveying section 2 when assembled. Reference numeral 10 denotes a body frame, 11 a bottom cover which is fitted to the body frame 10 by means of screws 11a, 11b, reference numeral 12 represents an upper cover, and 13 a recording cover which forms a unit as shown by a broken line in cooperation with the printing section 5 when assembled. Reference numeral 14 denotes a control circuit substrate which is separated by the body frame 10 from the other units and the electronic components and arranged in the bottom portion of the apparatus body. In order to repair the control circuit substrate 14 attached to the bottom cover 11, the bottom cover 11 can be opened as shown in FIG. 2 by removing the screws 11a and 11b. Reference numeral 15 is a power supply unit, 16a and 16b denote a connection cord, and 17 an aperture provided on the body frame 10, through which the power supply unit 15 is connected to the control circuit substrate 14 with the aid of the connection cord 16a, and through which the printing section 5 is also connected to the power supply unit 15 with the aid of the connection cord 16b. Reference numeral 18 denotes a ejected paper receiving tray and 19 a speaker fixed to the bottom cover 11. The speaker 19 is located at a lower portion between a roll paper receiving section 27 and the printing section 5. This portion is a dead space of the apparatus which is formed by the body frame 10 so as to make effective use of the dead space. The bottom cover 11 is extended up to the position, and on the extension of the bottom cover there are provided large-sized electric components such as the speaker 19. Reference numeral 20 signifies a shield plate.

Reference numeral 27 designates the roll paper receiving section having therein a partition plate 28 which differs depending on the paper width, and having hook apertures 27a, 27b for catches 28a, 28b of the partition plate 28. On the lower portion of the roll paper receiving section 27, there are provided ribs 27c, 27d surrounding the hook apertures 27a, 27b. The bottom cover 11 is extended up to the position below the roll paper receiving section 27, the inner surface of the bottom cover is brought into contact with the ribs 27c, 27d when the bottom cover is closed. This causes the hook apertures 27a, 27b of the roll paper receiving section 27 to be separated from the control circuit substrate 14, thus preventing the foreign matters such as air dust from adhering to the control circuit substrate 34 through the hook apertures 27a, 27b.

The configurations of the power supply unit 15 acting as a first circuit substrate unit, and the electrical connection between the power supply unit 15 and the control circuit substrate 14 acting as a second circuit substrate unit, will be described hereinafter.

In the power supply unit 15, there is vertically arranged a power supply circuit $15_1$ having various components, perpendicular to which there is provided a support substrate $15_2$, to one end of which there is attached a first connector 26a. The substrates $15_1$ and $15_2$ are electrically connected by means of connectors 15a, 15b. The first connector 26a facing the aperture 17 is connected to the output circuit of the power supply substrate $15_1$ through the wiring pattern of the support substrate $15_2$. $15_3$ denotes a power supply frame serving as a chassis and a cooling fin. The connection cord 16a has one end connecting to the input circuit of the control circuit substrate 14 and the other end connecting to the second connector 26b which is connected with the first connector 26a of the power supply unit 15 through the aperture 17.

Figure 3:
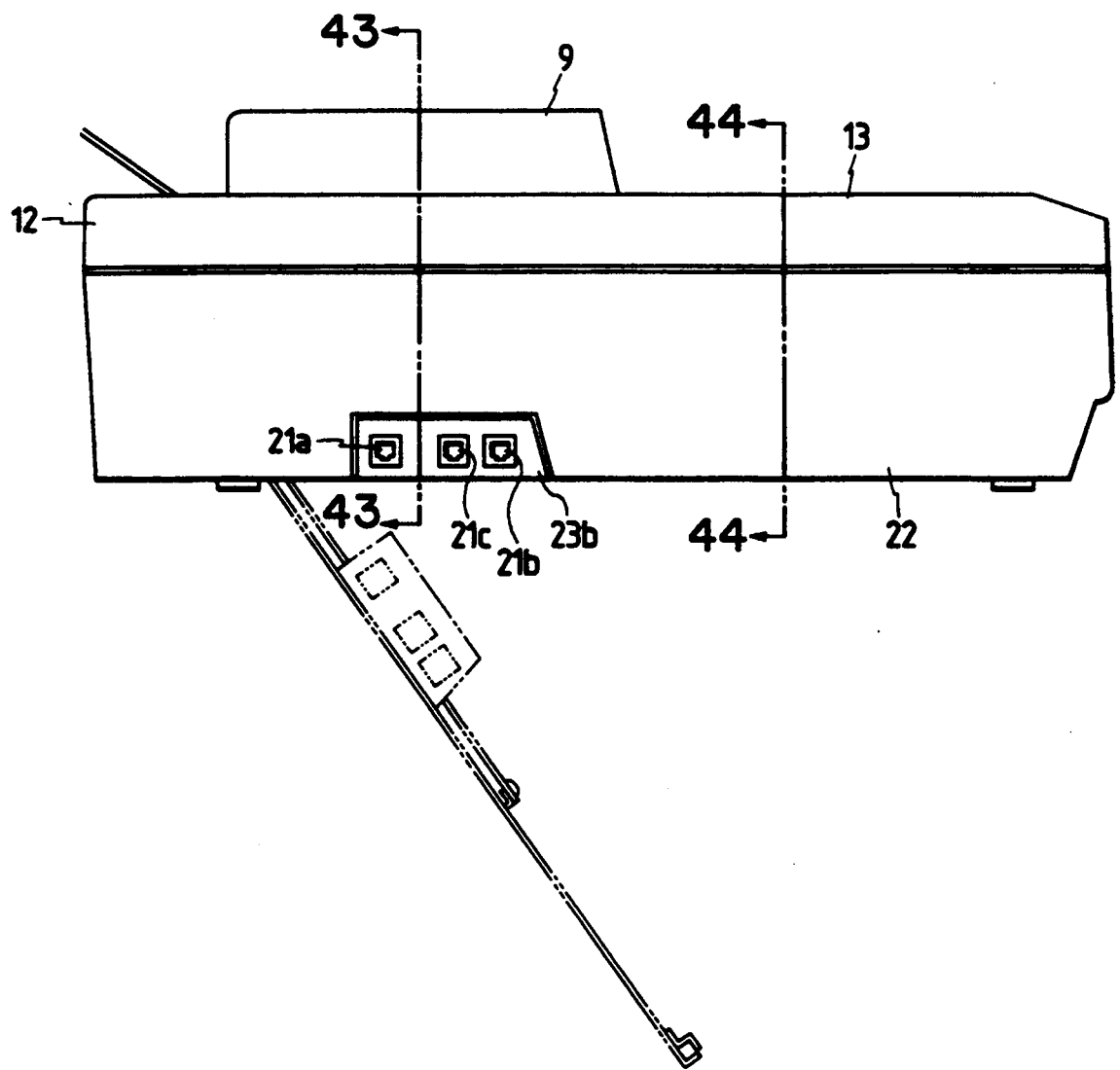
FIG. 3 is a side view of the apparatus shown in FIG. 1.

FIGS. 2 and 3 are lateral views of the apparatus shown in FIG. 1, in which reference numeral 22 denotes side walls which are molded separately from the body frame 10. The side walls 22 have their both sides notches 22a, 22b respectively for receiving the modular covers 23, 24 which are fixed to the substrate 14 with screws 23a and 24a. Modular terminals 21a to 21c in the cover 23 are soldered to the substrate 14. 21A is a line input of a general telecommunication circuit network, 21b is a telephone line to a hand set attached to the facsimile, 21c is a sub-telephone terminal for connecting a sub-telephone apart from the facsimile body. A modular terminal 24d in the cover 24 is also soldered to the substrate 14 as shown in FIG. 4.

Figure 4:
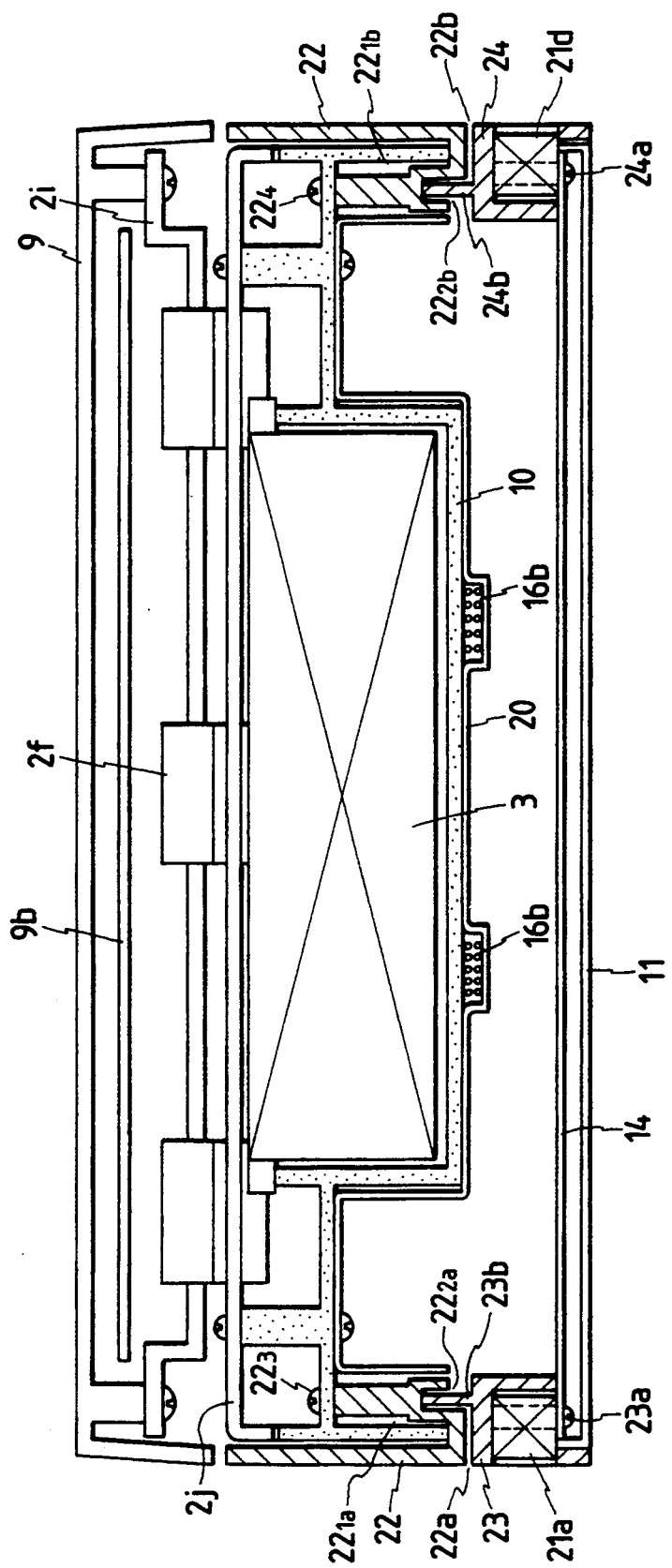
FIG. 4 is a sectional view taken along a line 43—43 in FIG. 3.
Figure 5:
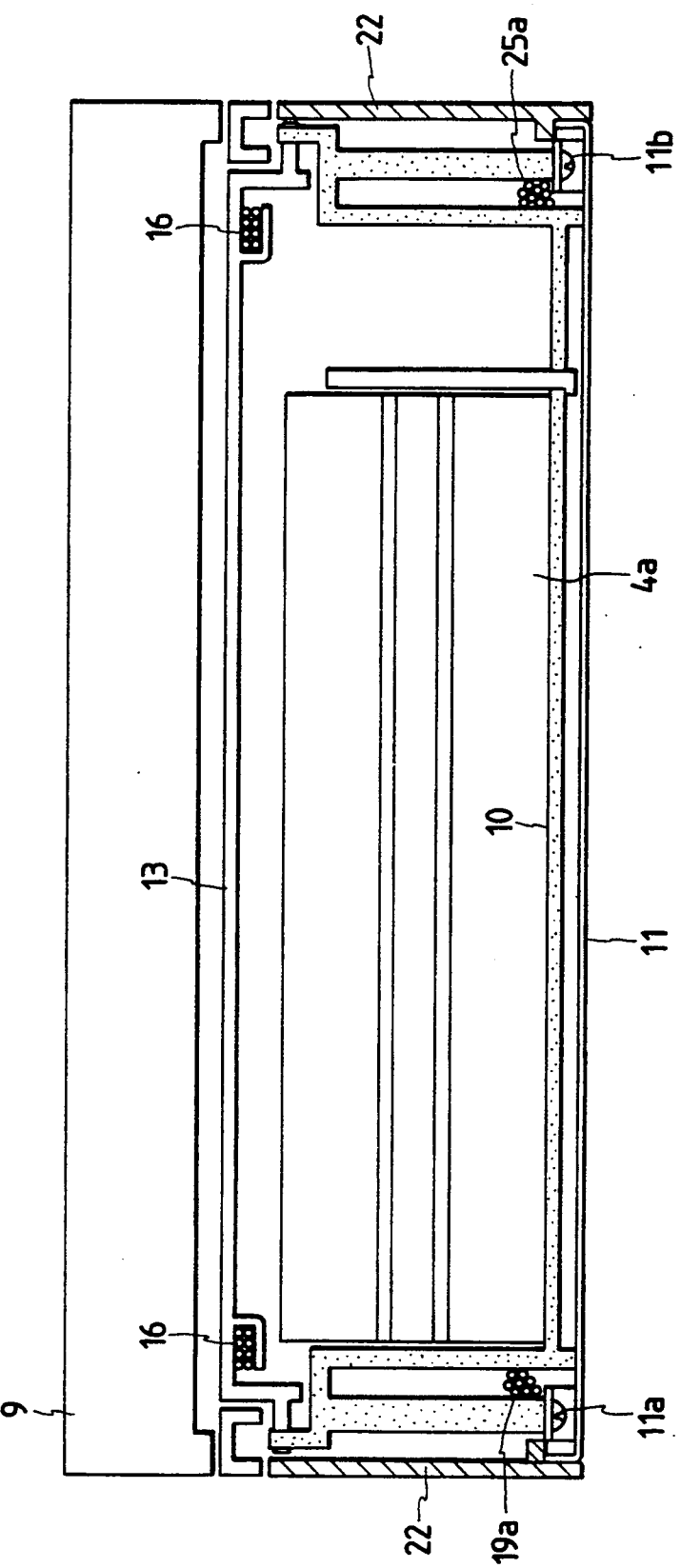
FIG. 5 is a sectional view taken along a line 44—44 in FIG. 3.
Figure 6:
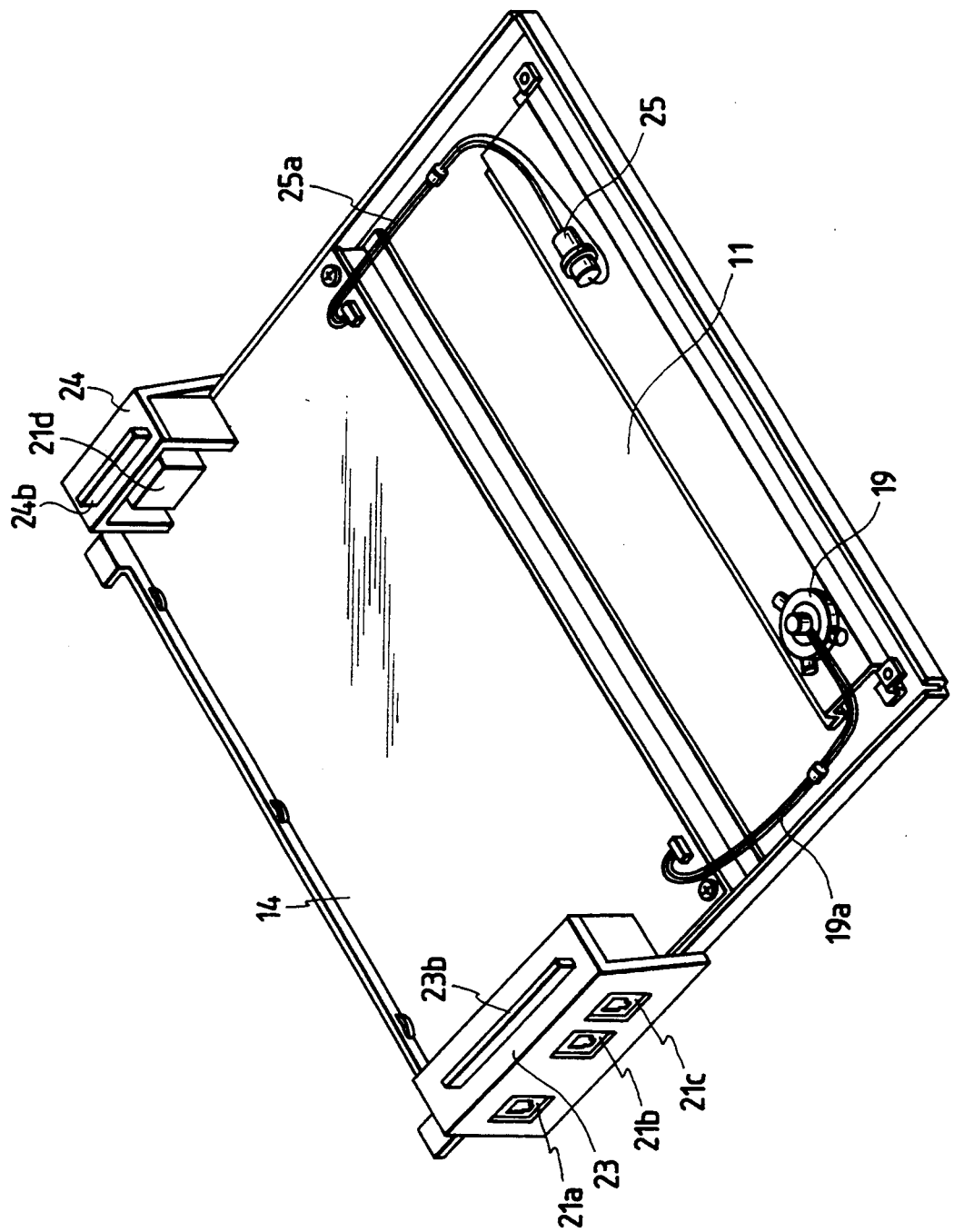
FIG. 6 is a perspective view of the bottom cover in FIG. 1.

Further, the side walls 22 are planar with the exception of the notches 22a, 22b for covers 23, 24 as shown in FIGS. 4 and 5. The notches 22a and 22b have at their upper portions grooves $221a$, $221b$ so as to engage with the body frame 10 as well as grooves $22_{2a}$, $22_{2b}$ which are engaged with protrusions 23b, 24b of the covers 23, 24. Such side walls 22 are fixed to the body frame 10 with screws $22_3$, $22_4$. The bottom cover 11 is configured as shown in FIG. 6 in which 25 denotes a memory back-up battery of the apparatus, 25a is a signal line, and 19a is a signal line for the speaker 19.

In this way, the side walls 22 are separately provided from the body frame 10, the space for the substrate 14 secured to the bottom cover 11 is defined by the side walls 22, and the bottom cover 11 is attached to the body frame 10, so as to maximize the space for mounting the substrate 14 and ensure the secure attachment of the bottom cover 11. Furthermore, the side walls 22 are provided with the notches 22a, 22b which receive the modular covers 23, 24 equipped with the modular terminals 21a to 21d, and the modular covers 23, 24 along with the modular terminals 21a to 21d are in turn attached to the substrate 14, thereby decreasing the number of the signal lines and holding the conversion components for the change of destination together with the bottom cover 11 as one unit. The surroundings of the notches 22a and 22b are strengthened by virtue of the modular covers 23, 24, side walls 22, and the body frame 10, thereby fully compensating the strength reduction caused by the formation of the notches 22a, 22b.

Hereinafter, description will be made of the document conveying system, in which;

Originals 1 stacked on the upper surface of the recording cover 13 are separated one by one with the aid of a preliminary conveying roller 2c in pressure-contact with a separation press piece 2a, and a separation roller 2d in pressure-contact with the separation friction piece 2b, conveyed by a paper feed roller 2g in pressure-contact with a press roller 2e, and a paper ejection roller 2h in pressure-contact with a press roller 2f, to finally stack up on the paper receiving tray 18. Reference numeral 2i means an upper original support, and 2j a lower original support.

Next, description will be made of the original reading system, in which;

the bottom surface of the original 1 further conveyed is illuminated by a light source 3b such as an LED array through a document glass 3a, the reflected light ray is led to a photoelectric conversion element 3g such as CCD by mirrors 3c, 3d, 3e through a lens 3f, and the obtained image is recorded by its own recording section 5 in copy mode, and transmitted to the recording portion of the other apparatus in facsimile mode (transmission mode).

The recording system will next be described, in which;

a thermosensible recording paper 4 in the form of roll paper is dropped in the roll receiving section of the frame 10. Reference numeral 4a shows a roll-full state and 4b shows a roll-empty state. The roll paper 4 does not curl due to a curl eliminating section 8, and is then conveyed in the direction of paper ejection by a platen roller 5a which is driven by a motor not shown. At that time, one-dot printing is carried out on the recording paper 4 through a heat-sensitive head (thermal head) 5b which is in pressure-contact with a platen roller 5a. As shown by a chain double-dashed line, the printed recording paper is passed between a fixed blade 6a and a rotationally shifting blade 6b of the cutter section, into a reverse tray section composed of an inner tray 7a and an outer tray 7b with its leading edge ahead. The recording paper successively fed by the platen roller is ejected to the outside of the apparatus turning in a loop with its leading edge inserted into the reverse tray section, to be ejected to the outside of the apparatus describing the loop shape. Each time one page is received, the shifting blade 6b is rotated upward in the figure to cut the paper, and the trailing edge is ejected to the outside of the apparatus with the leading edge clamped.

Description will be made of the curl eliminating section 8, in which;

reference numeral 8a represents a shiftable guide shaft, 8b a fixed shaft (which is fixed on the recording cover 13 side) and 8c a rotation axis of the guide shaft 8a. The shiftable guide shaft 8a is positioned according to the remaining roll diameter of the roll paper 4, that is, it is shifted to a position 8a in the figure by a mechanism not shown when the roll paper is small just as the core diameter, while to a position 8d in the figure when the roll paper is almost full, thereby change the amount of the roll paper rolled up onto the fixed shaft 8b.

Based on the difference in the rolled amount, the degree of the curl elimination is altered, to constantly confer a uniform flatness to the ejected roll paper.

Reference numeral 9 signifies an operation panel section, 9a a display such as a liquid crystal display LCD, 9d an operation panel control substrate OPCNT (operation control substrate), 9c a keytop, 9d a tact switch on the OPCNT.

Next, assembling of thus configured facsimile apparatus will be described.

In the first place, the injection-molded body frame 10 is attached to the side walls 22. For this the end of the body frame 10 is fitted into grooves $22_{1a}$, $22_{1b}$ of the side walls 22, and then the body frame 10 is secured to the side walls 22 with screws $22_3$, $22_4$. Subsequently, each unit is dropped into the body frame 10 by means of the automatic assembling machine to perform the assembling work. That is, first a unit equipped with the recording paper cutting section 6, and next a unit with the optical reading section 3 are mounted to the body frame 10, and then the power supply unit 15 is fitted into the receiving section of the body frame 10.

Thus, the first connector 26a which is connected to the output circuit of the power supply substrate $15_1$ through a wiring pattern of the support substrate $15_2$ is disposed facing the body frame 10, thereby facilitating the connection of the second connector 26b to the first connector 26a through the aperture 17.

Further, a unit provided with the recording cover 13 and the printing section 5 is mounted to the body frame 10.

Furthermore, a unit with the lower portion of the document conveying section 2 is mounted to the body frame 10.

Finally, a unit equipped with the upper portion of the document conveying section 2 and the operation panel 9 is mounted to the body frame 10.

Thus the automatic assembly through drop-in of each unit is completed, followed by assembling the other components onto the body frame 10. In the course of the assembling the other components, the bottom cover 11 equipped with a control circuit substrate 14 and the speaker 19 is to be mounted to the body frame 10. At this time, the catches located at the end of the bottom cover 11 are hooked into the grooves of the body frame 10, and then the protruding pieces 23b, 24b of the modular covers 23, 24 is fitted in the groove portions $22_{2a}$, $22_{2b}$ of the side walls 22, and the bottom cover 11 is fastened to the body frame 10 with screws 11a, 11b.

Through the combination of the bottom cover 11 and the body frame 10, the inner surface of the bottom cover 11 is abutted with the ribs 27c, 27d, and thereby the hook apertures 27a, 27b of the roll paper receiving section 27 are separated from the control circuit substrate 14, thus preventing an entry of air dust through the hook apertures 27a, 27b into the control circuit substrate 34.

Further, in order to electrically connect the control circuit substrate 14 to the power supply unit 15, the second connector 26b of the connection cord 16a which is linked with the input circuit of the control circuit substrate 14 has only to be connected to the first connector 26a of the power supply unit 15 through the aperture 17 of the body frame 10.

In addition, the electrical connection between the power supply unit 15 and the unit having the printing section 5 is carried out in the same manner by means of the connection cord 16b through the aperture 17. Similarly, the electrical connection between the control circuit substrate 14 and the power supply unit 15, and other unit are also carried out by the connection cord through an aperture not shown of the body frame 10.

Next, description will be made of the cases where the assembling defect is adjusted and the control circuit substrate 34 is checked or replaced due to the maintenance in the market. By removing the screws 11a, 11b of the bottom cover 11 of the facsimile apparatus assembled as described above, the bottom cover 11 is opened as shown in FIG. 2. Providing the side surface on the far side of the apparatus is stood against the desk or the like, the bottom cover can be easily opened to check the control circuit substrate 14 and perform the troubleshooting. Further, what is required to change the destination is merely to replace the substrate 14 or entirety of the bottom cover 11 by virtue of the integrated structure of the substrate 14 with the modular terminals.

In the above embodiment, the modular covers 23, 24 are screwed to the substrates 14, but instead they may be fixed to the bottom cover 11. The similar effects can be also obtained by a temporary locking such as hooking by use of catches in place of screwing since the modular covers are clamped between the substrate 14 and the cover 11 at the time of assembling.

Figure 7:
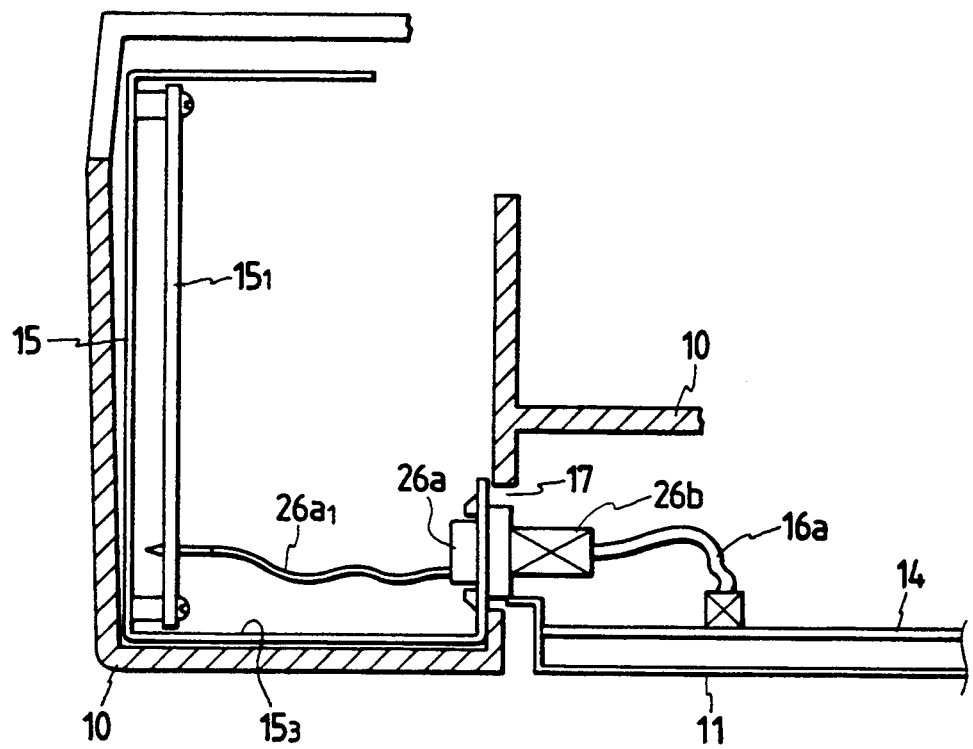
FIG. 7 shows a variant of the electric connection between a power supply unit and a control circuit substrate as shown in FIG. 1.

In the above embodiment, a sub-substrate loaded with connectors and serving as a support substrate is placed within the power supply. However, to obtain the similar effects, the connector 26a may be fixed to the frame $15_3$ of the power supply unit 15 with machine screws, and linked with the main substrate $15_1$ through a lead wire $26_{a1}$ as shown in FIG. 7.

Figure 8:
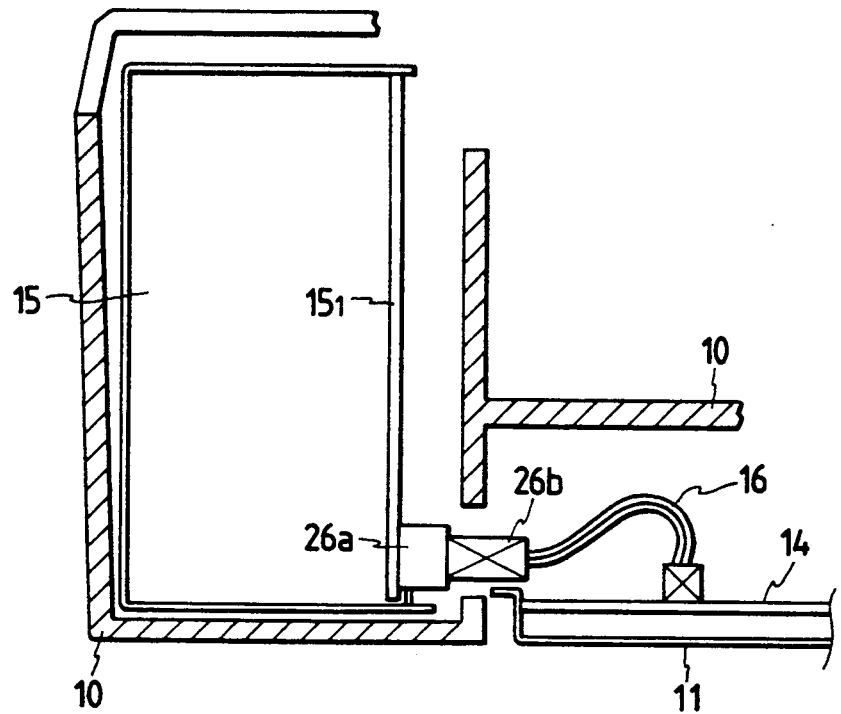
FIG. 8 shows another variant of the electrical connection between the power supply unit and the control circuit substrate.
Figure 9:
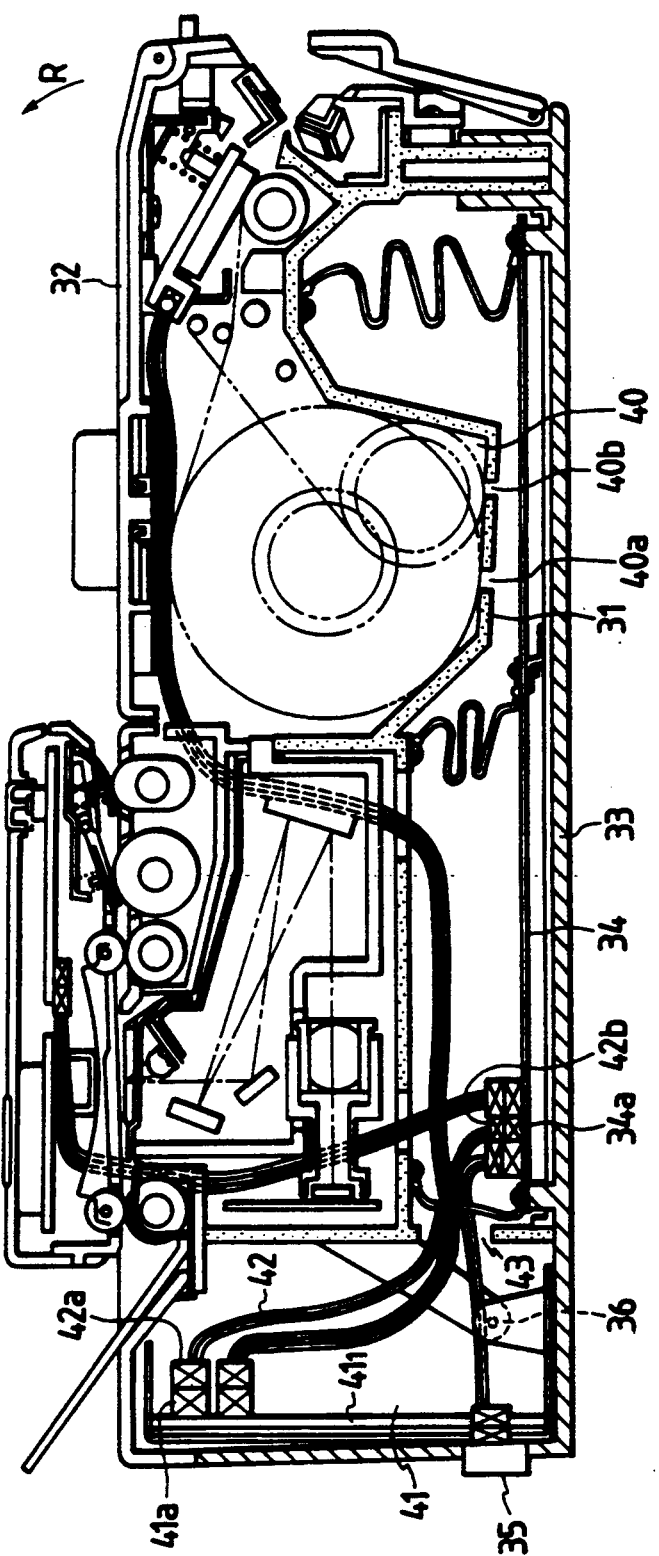
FIG. 9 is a structural drawing of the conventional facsimile apparatus.
Figure 10:
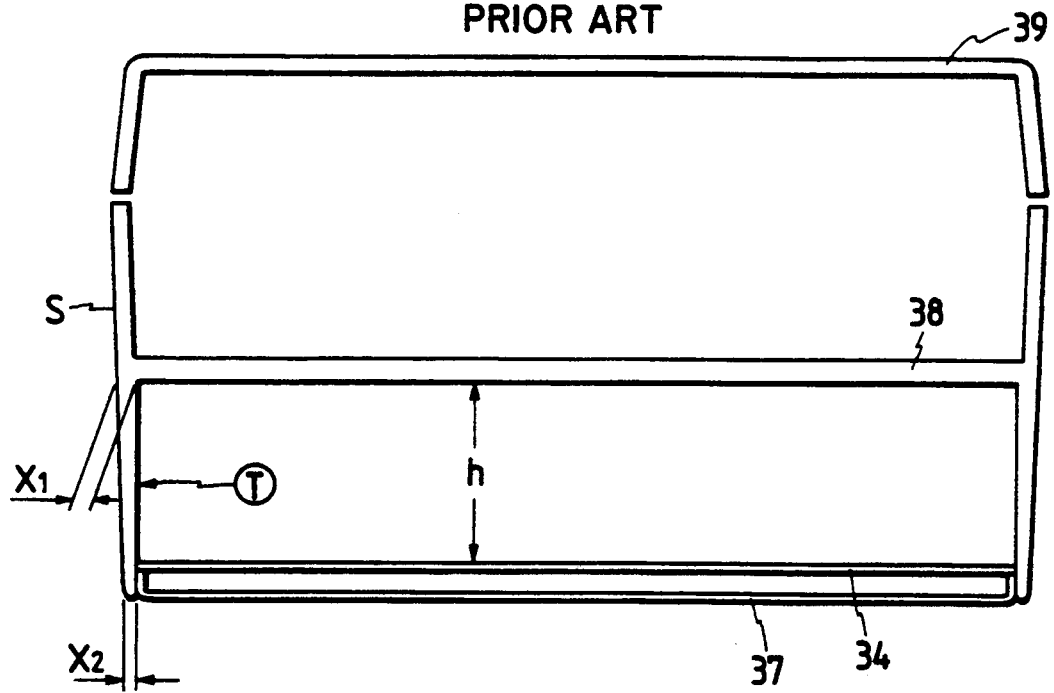
FIG. 10 is a schematic diagram of the facsimile apparatus in FIG. 7 in which the bottom cover is releasable.
Figure 11:
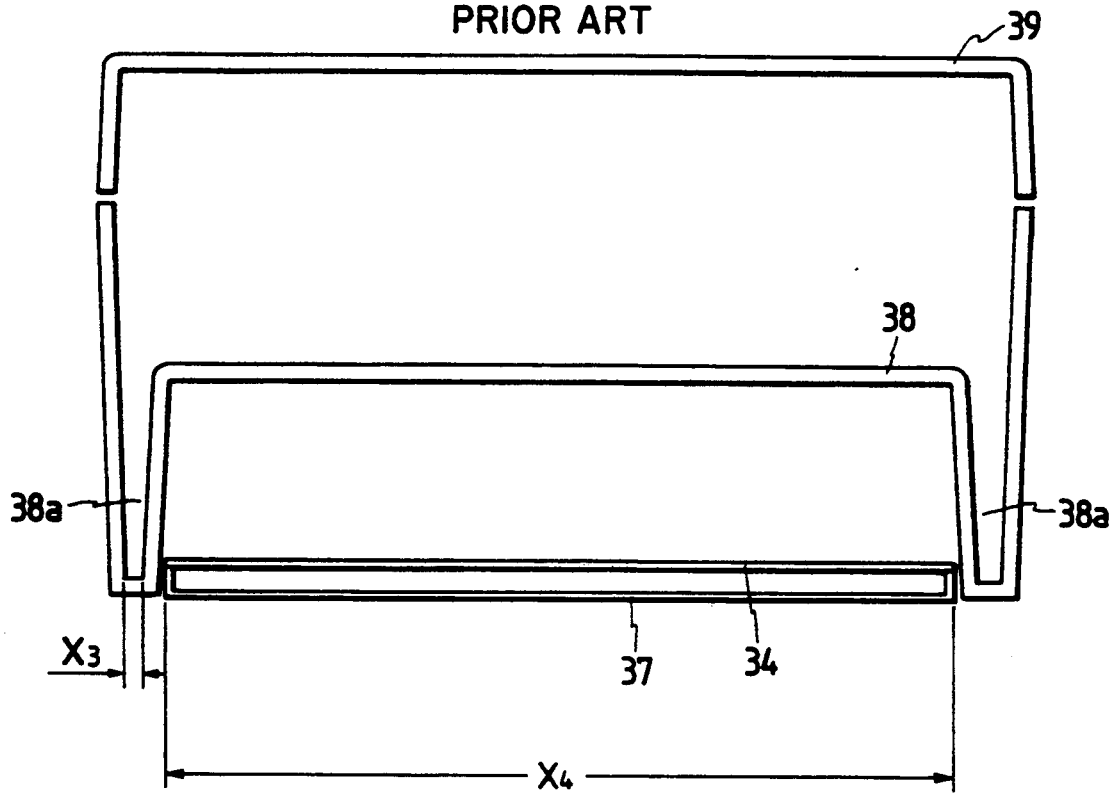
FIG. 11 is also a schematic diagram but of the conventional facsimile apparatus which strengthens the apparatus in FIG. 10.

Also, in a structure having a space for arranging the power supply substrate $15_1$ in the center of the apparatus as shown in FIG. 8, it is possible that the connector 26a is attached to the lower portion of the reverse side of the power supply substrate $15_1$, and the connector 26b from the control circuit substrate 14 is accessed through the reverse side of the substrate $15_1$. Further at this time, a right-angle type connector 26a may be provided by notching the lower portion of the substrate $15_1$, thus allowing the connector to be inserted from the lower portion of the control circuit substrate 14 by mounting the power supply output connector onto the reverse side of the substrate $15_1$.

Also, the description of the above embodiment is made with regard to the structure where the power supply is not overlaid on the control circuit substrate 14 when perspectively viewed from the above of the apparatus body. Depending on the dimensions of the apparatus, the position of the power supply in FIG. 1 may be shifted upward to place the control circuit substrate on the far side in the lower portion of the power supply, whereby the control circuit substrate connector can be inserted upwardly from the below through the aperture of the bottom cover or the frame which is positioned below the power supply on the control circuit substrate, thus obtaining the similar effects.

In the above embodiment, the roll paper receiving section of the body frame is slightly tilted toward the front side of the apparatus, which aims at an effect that when the diameter of the roll paper has become small, the roll paper can rest on the front side of the apparatus due to the gravity. In the case where the friction coefficients of the apparatus having a support of the roll paper and a roll paper receiving surface are extremely small, the surface may be flat, or the roll paper receiving section may be brought into intimate-contact with the bottom cover. In addition, the ribs are formed on the body frame side, instead the ribs and spot members may be provided on the bottom cover. Furthermore, above description is made of the apparatus in which the recording section is positioned at the front, and the original is conveyed to the rear. But instead an apparatus of a type laterally disposing the apparatus of the above embodiment may be used to obtain the similar effects. In place of the ribs described above, a foamed moltplane rubber may be stuck, or the both may be executed at the same time to heighten the sealing properties.

Also, the above embodiment is provided with a speaker, a battery and the like as large-sized electric components, which are not exclusive. The use of any components capable of being directly connected to the control circuit substrates for a noise filter, a core, an illumination lighting inverter, and a driver circuit for motors leads to the same effect that a wire bundling is unnecessary at the time of mounting.

In accordance with the present invention as described above in detail, the control circuit substrate is arranged in the bottom portion of the apparatus body, the bottom cover capable of opening and closing the bottom portion of the apparatus body serves as a support member for the control circuit substrate, the input/output terminals for lines to be connected to the control circuit substrate are positioned at the side of the apparatus body, and the retaining frames for the input/output terminals are integrally formed with the bottom cover so as to constitute a part of the side wall of the apparatus body. Therefore, by merely replacing the bottom cover and the control circuit substrate, it is possible to change destination, and up-date the version due to a change in specifications, or to repair the substrate and the bottom cover only has to be opened. Furthermore, the space for the substrate is maximized, the sufficient strength of the apparatus can be obtained, and without any cable connecting the modular terminals and the circuit substrate, the connection of the input/output lines can be achieved by accessing from the side of the apparatus.

Moreover, the side walls are formed individually as members separate from the apparatus body, and include an upwardly extending groove which is engaged with the end of the body frame and a downwardly extending grooves which there are provided an upward extending groove which is engaged with the bottom cover, thereby fitting the side walls and the bottom cover to the body frame. Accordingly, the apparatus body can be formed by merely dropping-in from the above and screwing, thus ensuring the easy assembling of the apparatus.

The bottom cover is so formed as to extend up to the position of the recording roll paper receiving section in the recording section, and through the cooperation of the bottom cover and the recording roll paper receiving section, there is formed a section for preventing the foreign matter to invade through the aperture of the recording roll paper receiving section into control circuit substrate, thereby preventing the entry of the foreign matter through the aperture of the roll paper receiving section and the resultant trouble such as a short of the electric circuit of the circuit substrate, to consequently improve the safety.

Also, a large-sized components such as the speaker and the battery to be directly connected to the control circuit substrate can be arranged in the space between the roll paper and the platen roller, and the cables and the like can be fixed inside the unit, thus resulting in the reduction in the height of the circuit substrate itself which allows the height of the entire apparatus to be lowered, and leading to the reduction in the numbers of assembling steps owing to the easy maintenance, to consequently realize the low-cost apparatus.

Moreover, the first connector to be linked with the first circuit substrate unit is fastened to the support member extending from the first circuit substrate unit, while the first connector attached to the support member is so arranged as to confront the aperture of the body frame when the first circuit substrate unit is loaded into the apparatus body, and the second connector to be connected to the second circuit substrate unit is allowed to couple with the first connector through the aperture of the body frame. And accordingly, there is free from the inconvenience that the automatic assembling must be temporarily stopped to perform the manual operation, thereby enabling an effective and successive automatic assembling without any interruption.

I claim:

1. A circuit substrate holding apparatus for a facsimile comprising:
   an apparatus body having an upper portion, a bottom portion and a side portion formed with a notch portion;
   a control circuit substrate arranged on said bottom portion of said apparatus body;
   a bottom cover capable of opening and closing the bottom portion of said apparatus body, said bottom portion fixing said control circuit substrate and said bottom cover serving as a support member for said control circuit substrate;
   input/output terminals for lines to be connected to said control circuit substrate, said input/output terminals being fixed to said control circuit substrate and located at said notch portion of said side portion of said apparatus body; and
   retaining frames for said input/output terminals, said retaining frames being fixed to said control circuit substrate and shaped to correspond to the notch portions of the said portion of said apparatus body and being opened and closed unitedly with said control circuit substrate together with said input/output terminals.

2. A facsimile apparatus according to claim 1, wherein said bottom cover has one end engaged with said apparatus body and the other end screwed to said apparatus body.

3. A facsimile apparatus according to claim 1, wherein said bottom cover is so formed as to extend to one end of said apparatus body, wherein electric components are provided on said bottom cover at a position at said one end of said apparatus body.

4. A facsimile apparatus according to claim 3, wherein at said one end, in an upper portion of said apparatus body, there is provided a recording section including a printing section and a recording roll paper receiving section, and wherein the bottom cover extends under said printing section and said recording roll paper receiving section.

5. A circuit substrate holding apparatus for a facsimile comprising:
   an apparatus body having a body frame as a framework structure, wherein the body frame has an aperture;
   a recording section provided at one end and in an upper portion of said apparatus body, said recording section having a recording roll paper receiving section, said aperture being defined in the body frame at said recording section,
   wherein said recording roll paper receiving section is capable of receiving recording roll paper of different widths depending on partition plates, and wherein said aperture is capable of fitting the partition plates;
   a reading section provided at the other end of said apparatus body;
   a control circuit substrate arranged in a bottom portion of said apparatus body, said control circuit substrate being separated from the upper portion containing the recording section and the reading section by said body frame, wherein the recording section and the control circuit substrate communicate through said aperture;
   a bottom cover capable of opening and closing the bottom portion of said apparatus body, said bottom cover fixing said control circuit substrate and serving as a supporting member for said control circuit substrate and extending up to said recording roll paper receiving section, said bottom cover being opened and closed together with said control circuit substrate; and
   a foreign matter prevention section which is formed by said bottom cover and said recording roll paper receiving section, said prevention section preventing foreign matter from entering through the aperture into the control circuit substrate.

6. A circuit substrate holding apparatus for a facsimile comprising:

an apparatus body including bottom cover capable of opening and closing a bottom portion of said apparatus body and a body frame serving as a framework of said apparatus body and having an aperture, said body frame dividing inside of said apparatus body into a plurality of chambers;

a substrate receiving chamber which is one of said plurality of chambers and formed between said body frame and said bottom cover, said substrate receiving chamber being communicated with another chamber of said apparatus body through the aperture;

a control circuit substrate disposed in the substrate receiving chamber at the bottom portion of said apparatus body, said control circuit substrate being fixed to said bottom cover and supported by said bottom cover and opened and closed unitedly with said bottom cover;

a circuit substrate unit provided in said apparatus body;

a first connector connected to said circuit substrate unit, said first connector being attached to said circuit substrate unit and being so positioned as to confront the aperture of said body frame when said circuit substrate unit is loaded into said apparatus body; and a second connector connected to said control circuit substrate, said second connector being linked with said first connector through the aperture of said body frame.

* * * * *

UNITED STATES PATENT AND TRADEMARK OFFICE
CERTIFICATE OF CORRECTION

PATENT NO. : 5,335,083

DATED : August 2, 1994

INVENTOR(S) : HIROMICHI NAGANE

It is certified that error appears in the above-identified patent and that said Letters Patent is hereby corrected as shown below:

On the title page: Item

AT [56] REFERENCES CITED

U.S. Patent Documents, insert,
--4,768,100  8/88  Kunishima et al......358--.

Foreign Patent Documents, insert,
--59-207343  11/1984  Japan.............
  62-45264   2/1987   Japan.............
  1-37156    2/1989   Japan.............
  1-67060    3/1989   Japan.............
   361459    4/1990   Europe............
   361478    4/1990   Europe............--.

Other Documents, insert,
--Patent Abstracts of Japan, Vol. 9, No. 77
(M-369)(1800), April 6, 1985
Patent Abstracts of Japan, Vol. 11, No. 231,
(E-527)(2678), July 28, 1987.
Patent Abstracts of Japan, Vol. 13, No. 230,
(E-764)(3578), May 26, 1989
Patent Abstracts of Japan, Vol. 13, No. 280,
(E-779)(3628), June 27, 1989.--.

UNITED STATES PATENT AND TRADEMARK OFFICE
CERTIFICATE OF CORRECTION

PATENT NO. : 5,335,083
DATED      : August 2, 1994
INVENTOR(S): HIROMICHI NAGANE It is certified that error appears in the above-identified patent and that said Letters Patent is hereby corrected as shown below:

COLUMN 1

Line 6, "Jan. 5, 1991." should read --June 5, 1991.--.
Line 13, "Background" should read --Background Art--.
Line 21, "the" should be deleted.
Line 64, "a" should be deleted and "working." should read --work.--.
Line 66, "an" should be deleted.
Line 68, "raise" should read --rise--.

COLUMN 2

Line 13, "clicks" should read --clips--.

COLUMN 4

Line 19, "a ejected" should read --an ejected--.

COLUMN 5

Line 1, "their both sides" should read --side--.
Line 15, "grooves 221a, 221b" should read --$22_{1a}$, $22_{1b}$--.
Line 44, "Originals" should read --originals--.
Line 61, "element 3g" should read --element 3g,--.
Line 62, "CCD" should read --a CCD,--.

UNITED STATES PATENT AND TRADEMARK OFFICE
CERTIFICATE OF CORRECTION

PATENT NO. : 5,335,083
DATED : August 2, 1994
INVENTOR(S) : HIROMICHI NAGANE

It is certified that error appears in the above-identified patent and that said Letters Patent is hereby corrected as shown below:

COLUMN 7

Line 10, "the" (first occurrence) should be deleted.
Line 16, "is" should read --are--.
Line 24, "an" should be deleted.

COLUMN 9

Line 5, "substrate" should read --substrate,--.
Line 15, "a" should be deleted.
Line 35, "a" should be deleted.

Signed and Sealed this

Tenth Day of January, 1995

Attest:

BRUCE LEHMAN

Attesting Officer     Commissioner of Patents and Trademarks